Jan. 4, 1955 — E. L. LOTZ — 2,698,504
NOVEL GLASS FABRIC BUFFER WHEEL
Filed Dec. 21, 1949
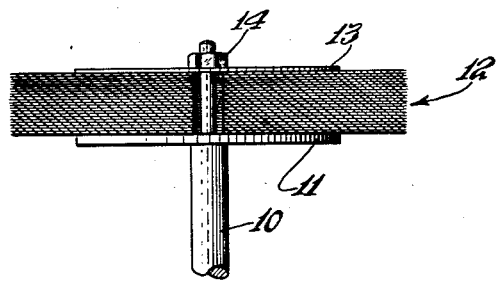
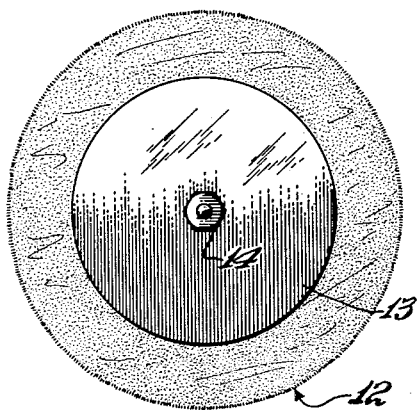
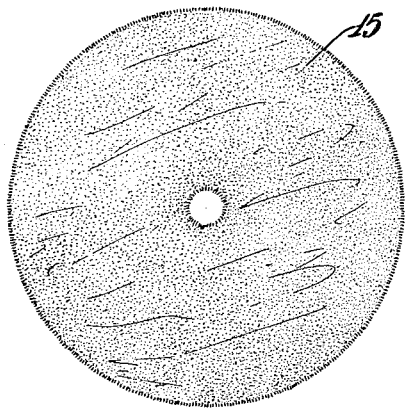
INVENTOR.
Edwin L. Lotz
BY
Angelo M. Pisarra
ATTORNEY United States Patent Office 2,698,504
Patented Jan. 4, 1955

2,698,504

NOVEL GLASS FABRIC BUFFER WHEEL

Edwin L. Lotz, Nutley, N. J., assignor, by mesne assignments, to Harvel Research Corporation, a corporation of New Jersey Application December 21, 1949, Serial No. 134,285

2 Claims. (Cl. 51—297)

This invention relates to novel articles of manufacture and to methods for making them. More particularly this invention is directed to buffer wheels and especially to those of the high temperature type. In one of its more specific aspects the invention is directed to novel fabrics finding especial application as buffing elements and being especially suitable for the polishing and buffing of metal objects and for the removal of solder flux and excess solder from so called tin cans in the source of their manufacture.

Prior to this invention, it was the practice in the tin can manufacturing industry to remove the excess molten solder and flux while still hot from the cans during their manufacture by subjecting them to the action of the periphery of a plurality of layer upon layer of cotton fabric secured to a rotating spindle. The primary disadvantage of such buffer wheels made up of said layers of cotton fabric was their short life, usually of 1–8 hours. The shortness of the life of the cotton fabric buffer wheels was due to the fact that when in contact with the molten materials, it either burned or charred in a short time. In normal operations, therefore, due to the short life of such wheels, it became necessary to stop frequently the automatic can producing machinery so that the cotton buffer wheels could be replaced.

It was in order to obviate, at least in part, the aforesaid disadvantages that the present invention has been made. In the course of experimentation relative to this problem, I have discovered that I may produce buffer wheels and fabrics having the following advantages:

When employed layer upon layer and secured to a rotating spindle and applied edgewise or periphery-wise to the molten or hot solder and flux on cans in the course of their manufacture.

1. The buffer will not burn or char;
2. The buffer will have a life of 50–70 hours of continuous operation;
3. The individual filaments separate from each other, upon the application of pressure, to provide a great number of individual minute filaments giving a soft uniform wiping surface which is essential for the desired buffing action.

The aforesaid as well as other objects and advantages of the present invention may be apparent from the following description taken together with the appended drawings wherein:

Fig. 1 is a side view of a buffing wheel on a spindle, a part of which is shown.

Fig. 2 is a top plan view of the construction shown in Fig. 1.

Fig. 3 is a top plan view of an annular individual sheet embodying the invention.

As shown in the drawings there is a spindle 10 carrying a support plate 11. Mounted on the support plate 11 and having an opening therethrough through which passes the outer end of the spindle 10 is a buffer 12 which may be demountably locked to the spindle by a top plate 13 and nut 14. The buffer wheel 12 consists of a plurality of layers 15 of fabric or cloth laid flatwise layer on layer, using 50–100 or more of said layers to provide a wheel 12 of the desired thickness. Each layer 15 is essentially a disc having a central opening therethrough. Generally the stack of discs 15 are held together by stitching 16 around the central opening.

According to this invention, each of said discs 15 comprises a woven thread or yarn fabric, having a thread or yarn count in the range of 40 x 30 to 90 x 60 and preferably 60 x 58 per square inch, with each yarn or thread containing glass filaments in the count range of 150–408. Such a glass cloth is treated to impregnate the individual filaments with a resin which acts as a binder between the filaments of the yarn but does not fill the interstices between the yarns of the cloth. For this purpose of the invention there is employed an alkyl phenyl polysiloxane, and the alkyl group may be methyl, ethyl, propyl, etc. These resins are capable of remaining flexible and non-hardening at 500° F. over a one hour period, are capable of binding the filaments to each other and to maintain this binding action for a period of one hour at 500° F.

The resin may be coupled with the cloth by passing the glass cloth through a solution or dispersion of the binder in a solvent. Then the loaded glass cloth is passed through pressure rolls to control the amount of said solution in the cloth and following this step the solvent is driven off to partially set the resin deposited between the individual filaments. In this manner, the individual yarns are impregnated to coat the individual filaments thereof with said resin which acts as a binder between the filaments, but does not fill the interstices between the yarns of the fabric. The finished fabric is now cut to provide discs 15.

One of the methods which may be employed to obtain the resin impregnated fabric is to pass a length of said glass cloth fabric through a solution of an alkyl phenyl polysiloxane which is normally liquid and examples of which are those appearing on the market as solutions of the Dow Corning Corporation under the names of "DC 996 Silicone Varnish" and "DC 993 Silicone Varnish," both of which are usually 50% solutions of methyl phenyl polysiloxane in toluene. For my purposes the solutions are first diluted to approximately 25% solids by adding sufficient toluene or xylol and it is through such diluted solutions that the fabric is passed. Then the impregnated fabric is wiped with a doctor and subsequently maintained at a temperature of 300–325° F. for about 15–20 minutes whereupon the solvent has been substantially driven off and the resin has been converted from the normally liquid to a tough, non-brittle gel. The amount of resin in said fabric measures in the range of about .5–2 ounces per square yard of fabric.

Another method which may be employed is to provide a dispersion of one of said solutions "DC 996 Silicone Varnish" or "DC 993 Silicone Varnish" in water. Such dispersions are made up in the proportion of 150 grams of water, 100 grams of one of said solutions and 5–10 grams of a dispersing agent which may be made up of 5 grams of morpholine and 5 grams of oleic acid. The glass fabric may be passed through said dispersion, wiped or doctored, then maintained at 300–325° F. for 15–20 minutes to drive off the water, solvent and dispersing agent and to convert the resin to a tough gel which is not brittle and measuring .5–2 ounces per square yard of fabric.

By whatever method employed, the resin is substantially uniformly distributed throughout said fabric and between the filaments of the yarns or threads thereof to act as a binder therebetween without filling the voids or interstices between the yarns or threads.

The resin containing fabric is now cut into discs 15 and these discs are assembled in the manner shown in Fig. 1 of the drawings. The buffer wheel 12 so produced is mounted on the spindle as shown. The combination is rotated and the tin cans containing the solder and flux are moved in the path of the rotating buffer wheel 15. The outer or the free or wiping ends of the yarns or threads on contact with the hot solder will have the ends of the filaments thereof move away from each other whereby an end brushing effect is obtained. The presence of said binders even in the limited amounts herein recited, permit the attainment of this effect and at the same time the remainder of the lengths of the filament are kept from coming apart due to the presence of the binder. In actual commercial practice buffer wheels of my novel fabrics have been far superior in both performance and life when compared with those of cotton which had been used commercially heretofore for that purpose.

These fabrics have served as excellent buffer wheel materials, especially in the tin can art to wipe off the excess hot solder and flux. Upon application of pressure, as rubbing against the surface of the metal, the ends of the individual filaments of the yarns separate from one another to provide a soft uniform wiping surface which is necessary for buffing wheels.

While this invention has been described in detail, it is not to be limited thereby because various changes and modifications may be made within the spirit thereof.

Having thus described my invention, what I claim is:

1. A novel buffer comprising a plurality of approximately disc-shaped layers laid flatwise one on the other and secured together with each layer comprising a woven glass fabric having a count in the range of 40 x 30 to 90 x 60, said fabric comprising yarn containing from 150–408 individual glass filaments, and alkyl phenyl polysiloxane resinous binder for said filaments, the quantity of said binder in said fabric being in the proportion of .5–2 ounces of binder to 1 square yard of said fabric.

2. A novel buffer as defined in claim 1 with said alkyl phenyl polysiloxane being methyl phenyl polysiloxane.

References Cited in the file of this patent

UNITED STATES PATENTS

| | | |
|---|---|---|
| 1,737,574 | Divine | Dec. 3, 1929 |
| 2,215,061 | Alt | Sept. 17, 1940 |
| 2,390,370 | Hyde | Dec. 4, 1945 |
| 2,392,805 | Biefeld | Jan. 15, 1946 |
| 2,449,572 | Welsh | Sept. 21, 1948 |
| 2,492,498 | Pedersen | Dec. 27, 1949 |
| 2,494,920 | Warrick | Jan. 17, 1950 |
| 2,530,635 | Sowa | Nov. 21, 1950 |